(12) United States Patent
Justak

(10) Patent No.: US 8,002,285 B2
(45) Date of Patent: *Aug. 23, 2011

(54) NON-CONTACT SEAL FOR A GAS TURBINE ENGINE

(76) Inventor: John F. Justak, Stuart, FL (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/129,735

(22) Filed: May 30, 2008

(65) Prior Publication Data

US 2008/0246223 A1 Oct. 9, 2008

Related U.S. Application Data

(63) Continuation-in-part of application No. 11/953,099, filed on Dec. 10, 2007, which is a continuation-in-part of application No. 11/669,454, filed on Jan. 31, 2007, now Pat. No. 7,410,173, which is a continuation-in-part of application No. 11/226,836, filed on Sep. 14, 2005, now Pat. No. 7,182,345, which is a continuation of application No. 10/832,053, filed on Apr. 26, 2004, now abandoned.

(60) Provisional application No. 60/466,979, filed on May 1, 2003.

(51) Int. Cl.
*F16J 15/447* (2006.01)
(52) U.S. Cl. .................................................. 277/412
(58) Field of Classification Search ................ 277/412, 277/414–415, 418, 421; 415/173.1, 231, 415/115, 138
See application file for complete search history.

(56) References Cited

U.S. PATENT DOCUMENTS

| 2,245,281 | A | * | 6/1941 | Klopak | 277/419 |
| 3,162,451 | A | * | 12/1964 | Brose | 277/415 |
| 3,365,172 | A | * | 1/1968 | Werner et al. | 415/117 |
| 3,791,657 | A | * | 2/1974 | Bilski | 277/347 |
| 3,917,150 | A | | 11/1975 | Ferguson et al. | |
| 4,411,594 | A | | 10/1983 | Pellow et al. | |
| 4,600,202 | A | | 7/1986 | Schaeffler et al. | |
| 4,650,394 | A | * | 3/1987 | Weidner | 415/115 |
| 5,026,252 | A | | 6/1991 | Hoffelner | |
| 5,181,728 | A | | 1/1993 | Stec | |
| 5,183,197 | A | | 2/1993 | Howe | |
| 5,238,308 | A | | 8/1993 | Lang et al. | |
| 5,755,445 | A | | 5/1998 | Arora | |
| 5,799,952 | A | | 9/1998 | Morrison et al. | |
| 5,944,320 | A | | 8/1999 | Werner et al. | |
| 5,997,004 | A | | 12/1999 | Braun et al. | |
| 6,079,714 | A | | 6/2000 | Kemsley | |
| 6,079,945 | A | | 6/2000 | Wolfe et al. | |
| 6,254,344 | B1 | | 7/2001 | Wright et al. | |

(Continued)

FOREIGN PATENT DOCUMENTS

EP 0 778 431 A1 6/1997

(Continued)

*Primary Examiner* — Vishal Patel
(74) *Attorney, Agent, or Firm* — GrayRobinson, PA

(57) ABSTRACT

A seal comprises the combination of a primary seal and a secondary seal each of which acts on at least one shoe that is installed with clearance relative to one of a rotor and a stator in a position to create a non-contact seal therewith. The at least one shoe is provided with a surface geometry that influences the inertia of fluid flowing across the seal, and, hence, the velocity of the fluid and the pressure distribution across the seal, ultimately affecting the balance of forces applied to the seal.

12 Claims, 7 Drawing Sheets

U.S. PATENT DOCUMENTS

| | | |
|---|---|---|
| 6,428,009 B2 | 8/2002 | Justak |
| 6,558,041 B2 | 5/2003 | Laos |
| 6,840,519 B2 | 1/2005 | Dinc et al. |
| 7,121,551 B2 * | 10/2006 | Dunford et al. ............... 277/349 |
| 7,182,345 B2 | 2/2007 | Justak |
| 7,314,218 B2 * | 1/2008 | Hughes ......................... 277/349 |
| 2004/0119238 A1 * | 6/2004 | Skumawitz et al. .......... 277/412 |

FOREIGN PATENT DOCUMENTS

| | | |
|---|---|---|
| EP | 1 420 145 A2 | 5/2004 |
| JP | 4347066 A | 12/1992 |
| WO | 01/48887 A2 | 7/2001 |

* cited by examiner

US 8,002,285 B2

NON-CONTACT SEAL FOR A GAS TURBINE ENGINE

RELATED APPLICATIONS

This application is a continuation-in-part application of U.S. patent application Ser. No. 11/953,009 filed Dec. 10, 2007, which is a continuation-in-part of U.S. patent application Ser. No. 11/669,454 filed Jan. 31, 2007, which is a continuation-in-part application of U.S. patent application Ser. No. 11/226,836 filed Sep. 14, 2005 and now U.S. Pat. No. 7,182,345, which is a continuation of U.S. patent application Ser. No. 10/832,053 filed Apr. 26, 2004, now abandoned, which claims the benefit of U.S. Provisional Application Ser. No. 60/466,979 filed May 1, 2003 under 35 U.S.C. §119(e) for all commonly disclosed subject matter. U.S. Provisional Application Ser. No. 60/466,979 is expressly incorporated herein by reference in its entirety to form part of the present disclosure.

FIELD OF THE INVENTION

This invention relates to seals for sealing a circumferential gap between two machine components that are relatively rotatable with respect to each other, and, more particularly, to a non-contact seal especially intended for gas turbine engine applications having at least one shoe supported by a number of spring elements so that a first surface of the at least one shoe extends along one of the machine components within design tolerances. The first surface of the at least one shoe may have a number of different geometries which influence the velocity and pressure distribution of the fluid flowing across the seal thus allowing the seal clearance to be controlled in both directions, e.g. a larger or smaller radial clearance with respect to a machine component.

BACKGROUND OF THE INVENTION

Turbomachinery, such as gas turbine engines employed in aircraft, currently is dependent on either labyrinth (see FIGS. 1A-1E), brush (see FIGS. 2A and 2B) or carbon seals for critical applications. Labyrinth seals provide adequate sealing but they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, such as during a high-G maneuver, there is the potential for increases in engine vibration. Straight-thru labyrinth seals (FIG. 1A) are the most sensitive to clearance changes, with large clearances resulting in a carryover effect. Stepped labyrinth seals (FIGS. 1B and 1C) are very dependent on axial clearances, as well as radial clearances, which limits the number of teeth possible on each land. Pregrooved labyrinth seals (FIG. 1D) are dependent on both axial and radial clearances and must have an axial clearance less than twice the radial clearance to provide better leakage performance than stepped seals.

Other problems associated with labyrinth seals arise from heat generation due to knife edge to seal land rub, debris from hardcoated knife edges or seal lands being carried through engine passages, and excessive engine vibration. When seal teeth rub against seal lands, it is possible to generate large amounts of heat. This heat may result in reduced material strength and may even cause destruction of the seal if heat conducted to the rotor causes further interference. It is possible to reduce heat generation using abradable seal lands, but they must not be used in situations where rub debris will be carried by leakage air directly into critical areas such as bearing compartments or carbon seal rubbing contacts. This also holds true for hardcoats applied to knife edges to increase rub capability. Other difficulties with hardcoated knife edges include low cycle fatigue life debits, rub induced tooth-edge cracking, and the possibility of handling damage. Engine vibration is another factor to be considered when implementing labyrinth seals. As mentioned previously, this vibration can be caused by improper maintenance of radial clearances. However, it can also be affected by the spacing of labyrinth seal teeth, which can produce harmonics and result in high vibratory stresses.

In comparison to labyrinth seals, brush seals can offer very low leakage rates. For example, flow past a single stage brush seal is approximately equal to a four knife edge labyrinth seal at the same clearance. Brush seals are also not as dependent on radial clearances as labyrinth seals. Leakage equivalent to approximately a 2 to 3 mil gap is relatively constant over a large range of wire-rotor interferences. However, with current technology, all brush seals will eventually wear to line on line contact at the point of greatest initial interference. Great care must be taken to insure that the brush seal backing plate does not contact the rotor under any circumstances. It is possible for severing of the rotor to occur from this type of contact. In addition, undue wire wear may result in flow increases up to 800% and factors such as changes in extreme interference, temperature and pressure loads, and rubbing speeds must be taken into account when determining seal life.

The design for common brush seals, as seen in FIGS. 2A and 2B, is usually an assembly of densely packed flexible wires sandwiched between a front plate and a back plate. The free ends of the wires protrude beyond the plates and contact a land or runner, with a small radial interference to form the seal. The wires are angled so that the free ends point in the same direction as the movement of the runner. Brush seals are sized to maintain a tight diametral fit throughout their useful life and to accommodate the greatest combination of axial movement of the brush relative to the rotor.

Brush seals may be used in a wide variety of applications. Although brush seal leakage generally decreases with exposure to repeated pressure loading, incorporating brush seals where extreme pressure loading occurs may cause a "blow over" condition resulting in permanent deformation of the seal wires. Brush seals have been used in sealing bearing compartments, however coke on the wires may result in accelerated wear and their leakage rate is higher than that of carbon seals.

One additional limitation of brush seals is that they are essentially uni-directional in operation, i.e., due to the angulation of the individual wires, such seals must be oriented in the direction of rotation of the moving element. Rotation of the moving element or rotor in the opposite direction, against the angulation of the wires, can result in permanent damage and/or failure of the seal. In the particular application of the seals required in the engine of a V-22 Osprey aircraft, for example, it is noted that during the blade fold wing stow operation, the engine rotates in reverse at very low rpm's. This is required to align rotor blades when stowing wings. This procedure is performed for creating a smaller aircraft footprint onboard an aircraft carrier. Reverse rotation of the engine would damage or create failure of brush seals such as those depicted in FIGS. 2A and 2B.

Carbon seals are generally used to provide sealing of oil compartments and to protect oil systems from hot air and contamination. Their low leakage rates in comparison to labyrinth or brush seals are well-suited to this application but they are very sensitive to pressure balances and tolerance stack-ups. Pressure gradients at all operating conditions and especially at low power and idle conditions must be taken into account when considering the use of carbon seals. Carbon seals must be designed to have a sufficiently thick seal plate and the axial stack load path must pass through the plate as straight as possible to prevent coning of the seal. Another consideration with carbon seals is the potential for seepage, weepage or trapped oil. Provisions must be made to eliminate these conditions which may result in oil fire, rotor vibration, and severe corrosion.

According to the Advanced Subsonic Technology Initiative as presented at the NASA Lewis Research Center Seals Workshop, development of advanced sealing techniques to replace the current seal technologies described above will provide high returns on technology investments. These returns include reducing direct operating costs by up to 5%, reducing engine fuel burn up to 10%, reducing engine oxides of emission by over 50%, and reducing noise by 7 dB. For example, spending only a fraction of the costs needed to redesign and re-qualify complete compressor or turbine components on advanced seal development can achieve comparable performance improvements. In fact, engine studies have shown that by applying advanced seals techniques to just a few locations can result in reduction of 2.5% in SFC.

SUMMARY OF THE INVENTION

This invention is directed to a hybrid, non-contact seal for sealing the circumferential gap between a first machine component such as a stator and a second machine component such as a rotor which is rotatable relative to the stator.

In the presently preferred embodiment, the hybrid seal comprises the combination of a primary seal and a secondary seal each of which acts on at least one shoe extending along one of the rotor and stator in a position to create a non-contact seal therewith. At least one spring element is connected between one of the rotor and stator and the at least one shoe. The spring element(s) is flexible in the radial direction, but axially stiff so that it can function to assist in preventing roll over of the shoes with respect to the rotor or stator where it is located, thus maintaining an effective seal under pressure load. In one embodiment, stops are provided to limit the extent of radial motion of the shoe with respect to the rotor or stator. The spring element(s) deflects and moves with the at least one shoe in response to the application of fluid pressure applied to the at least one shoe to create a primary seal, within design tolerances, along the gap between the machine components.

The shoe(s) includes a first, sealing surface and a second surface opposite the first surface. The second surface is formed with a slot within which one end of a secondary seal may be disposed. It is contemplated that the slot may be positioned at the front (high pressure) or aft (low pressure) side of the shoe(s). The opposite end of the secondary seal is connected to one of the first and second machine components. The secondary seal deflects and moves with the shoe(s) in response to the application of fluid pressure applied to the shoe(s), and applies a force acting in the direction of one of the first and second machine components to assist with the creation of a secondary seal along the gap between the machine components.

In the presently preferred embodiment, the first, sealing surface of the shoe(s) may be formed with different geometric features to affect the clearance between the sealing surface of the shoe(s) and the first or second machine component. As discussed below, such geometric features influence fluid inertia, and ultimately the balance of forces applied to the shoe(s), allowing for improved control of the clearance between the seal and the first or second machine component.

The hybrid seal of this invention can be utilized in all seal applications, including labyrinth, brush and carbon. The robust design eliminates the careful handling now required of carbon seals utilized in lube system compartments. This seal may allow the engine designer to utilize less parts in the assembly as this seal will permit "blind" assemblies to occur.

The following table provides a comparison of the seal of the subject invention with currently available technology.

| Seal Type | Wear Rate | Leakage | Dependence on Clearances | Contamination Potential |
| --- | --- | --- | --- | --- |
| Labyrinth Seals | High | Low | High | High |
| Brush Seals | Medium | Low | Medium | Medium |
| Carbon Seals | Medium | Very Low | High | Low |
| Hybrid Seal | Low | Low | Low | Low |

DESCRIPTION OF THE DRAWINGS

The structure, operation and advantages of this invention will become further apparent upon consideration of the following description, taken in conjunction with the accompanying drawings, wherein.

DETAILED DESCRIPTION OF THE PREFERRED EMBODIMENTS

Figure 1A:
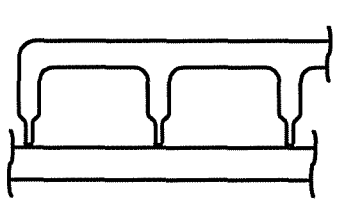
FIGS. 1A-1E are schematic views of a number of prior art labyrinth seals.
Figure 1B:
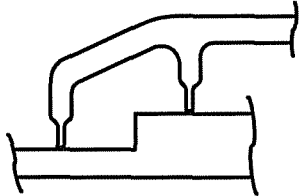
Figure 1C:
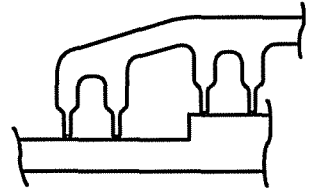
Figure 1D:
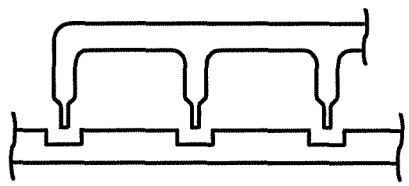
Figure 1E:
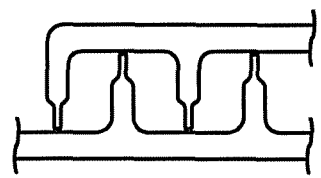
Figure 2A:
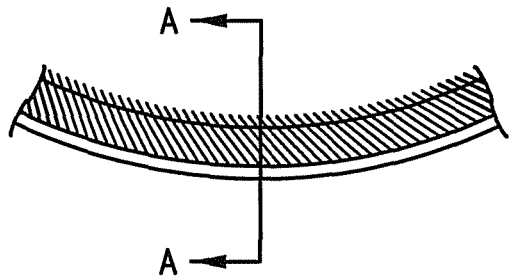
FIGS. 2A and 2B depict views of a prior art brush seal.
Figure 2B:
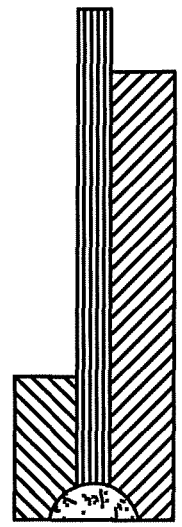

Referring initially to FIGS. 3-6, the hybrid seal 10 of this invention is intended to create a seal of the circumferential gap 11 between two relatively rotating components, namely, a fixed stator 12 and a rotating rotor 14. The seal 10 includes at least one, but preferably a number of circumferentially spaced shoes 16 which are located in a non-contact position along the exterior surface of the rotor 14. Each shoe 16 is formed with a sealing surface 20 and a slot 22 extending radially inwardly toward the sealing surface 20. For purposes of the present discussion, the term "axial" or "axially spaced" refers to a direction along the longitudinal axis of the stator 12 and rotor 14, e.g. axis 18 shown in FIGS. 3 and 10A-10G, whereas "radial" refers to a direction perpendicular to the longitudinal axis 18.

Figure 3:
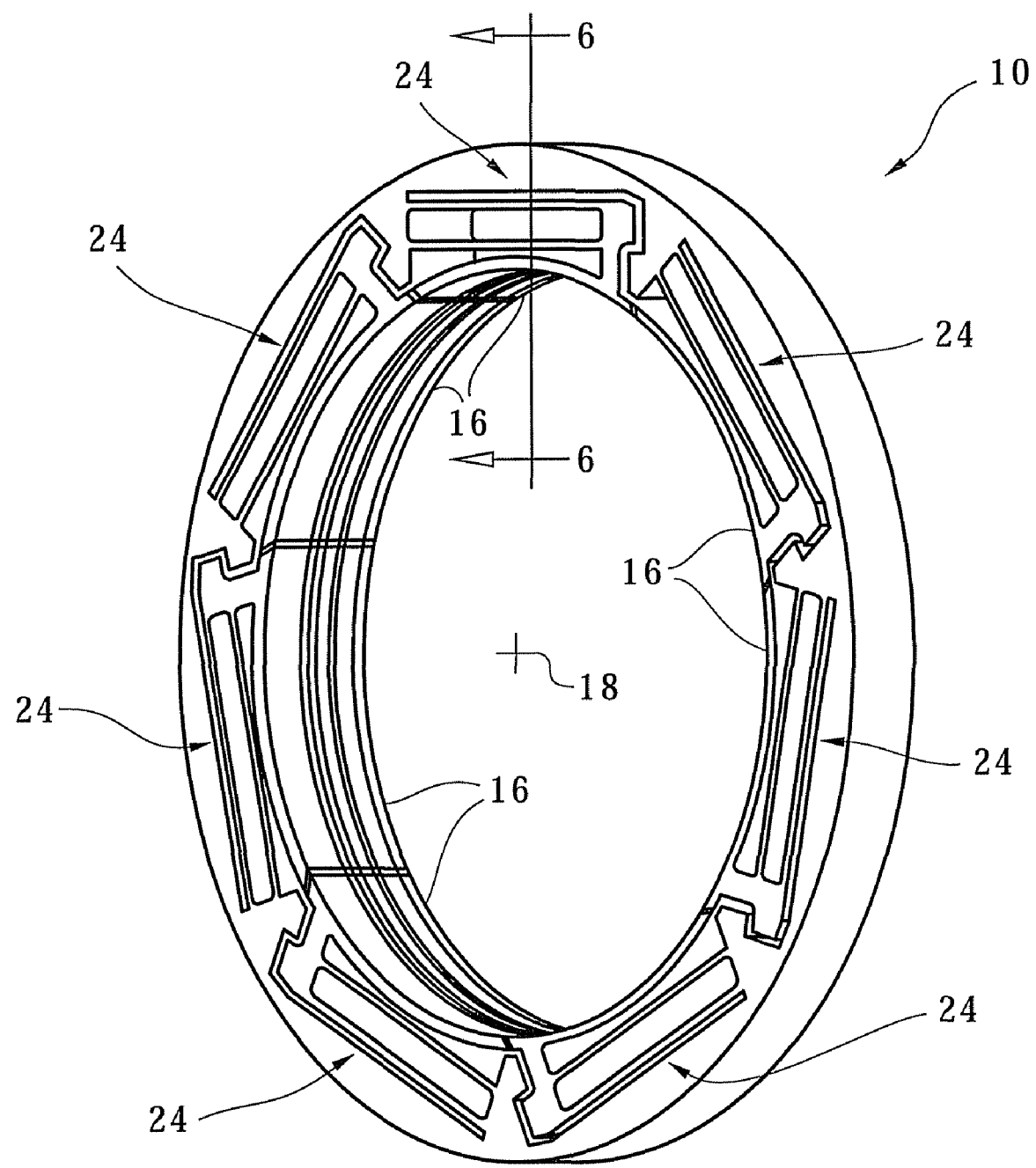
FIG. 3 is an isometric view of the hybrid seal of this invention.
Figure 4:
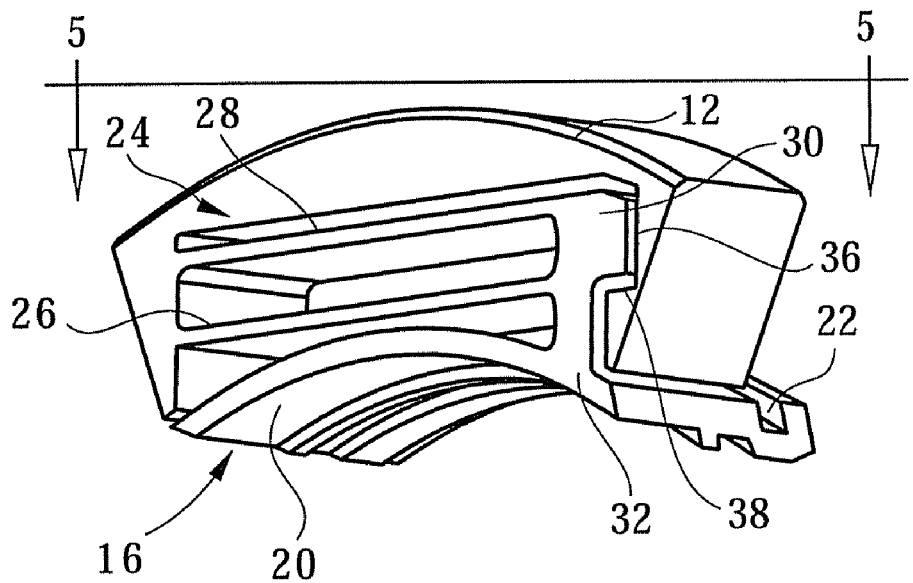
FIG. 4 is a partial, perspective view of the seal depicted in FIG. 3, illustrating a single shoe with the secondary seal removed.
Figure 5:
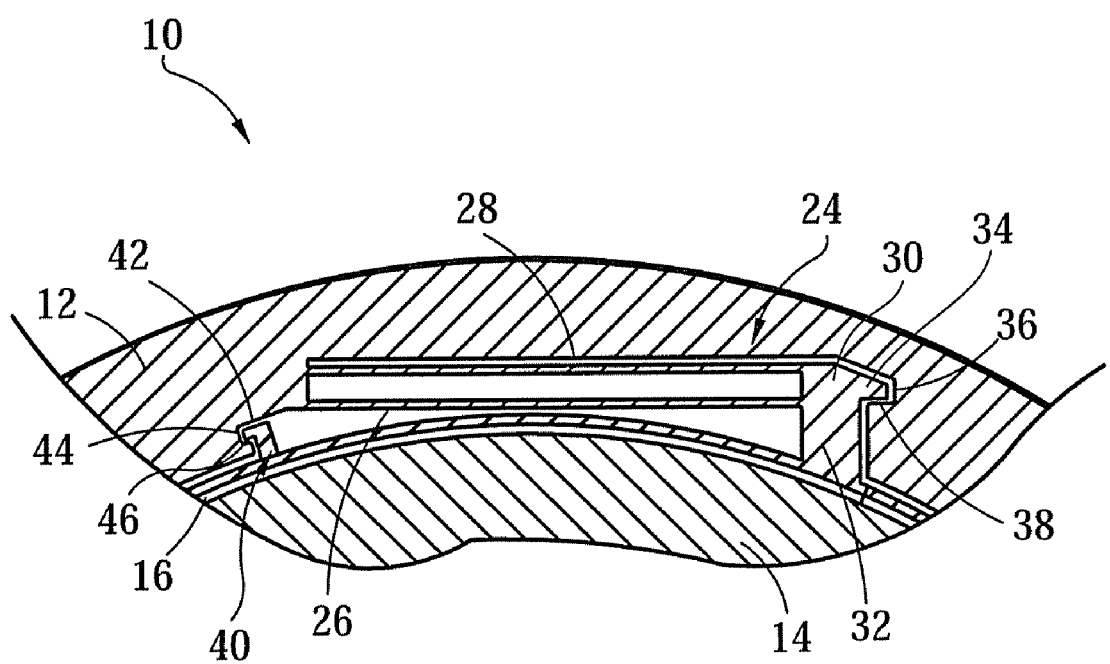
FIG. 5 is a cross sectional view taken generally along line 5-5 of FIG. 4.

Under some operating conditions, particularly at higher pressures, it is desirable to limit the extent of radial movement of the shoes 16 with respect to the rotor 14 to maintain tolerances, e.g. the spacing between the shoes 16 and the facing surface of the rotor 14. The seal 10 preferably includes a number of circumferentially spaced spring elements 24, the details of one of which are best seen in FIGS. 3 and 4. Each spring element 24 is formed with an inner band 26 and an outer band 28 radially outwardly spaced from the inner band 26. One end of each of the bands 26 and 28 is mounted to or integrally formed with the stator 12 and the opposite end thereof is connected to a first stop 30. The first stop 30 includes a strip 32 which is connected to a shoe 16 (one of which is shown in FIGS. 4 and 5), and has an arm 34 opposite the shoe 16 which may be received within a recess 36 formed in the stator 12. The recess 36 has a shoulder 38 positioned in alignment with the arm 34 of the first stop 30.

A second stop 40 is connected to or integrally formed with the strip 32, and, hence connects to the shoe 16. The second stop 40 is circumferentially spaced from the first stop 30 in a position near the point at which the inner and outer bands 26 and 28 connect to the stator 12. The second stop 40 is formed with an arm 42 which may be received within a recess 44 in the stator 12. The recess 44 has a shoulder 46 positioned in alignment with the arm 42 of second stop 40.

Particularly when the seal 10 of this invention is used in applications such as gas turbine engines, aerodynamic forces are developed which apply a fluid pressure to the shoe 16 causing it to move radially with respect to the rotor 14. The fluid velocity increases as the gap 11 between the shoe 16 and rotor 14 increases, thus reducing pressure in the gap 11 and drawing the shoe 16 radially inwardly toward the rotor 14. As the seal gap 11 closes, the velocity decreases and the pressure increases within the seal gap 11 thus forcing the shoe 16 radially outwardly from the rotor 14. The spring elements 24 deflect and move with the shoe 16 to create a primary seal of the circumferential gap 11 between the rotor 14 and stator 12 within predetermined design tolerances. The purpose of first and second stops 30 and 40 is to limit the extent of radially inward and outward movement of the shoe 16 with respect to the rotor 14 for safety and operational limitation. A gap is provided between the arm 34 of first stop 30 and the shoulder 38, and between the arm 42 of second stop 40 and shoulder 46, such that the shoe 16 can move radially inwardly relative to the rotor 14. Such inward motion is limited by engagement of the arms 34, 42 with shoulders 38 and 46, respectively, to prevent the shoe 16 from contacting the rotor 14 or exceeding design tolerances for the gap between the two. The arms 34 and 42 also contact the stator 12 in the event the shoe 16 moves radially outwardly relative to the rotor 14, to limit movement of the shoe 16 in that direction.

Figure 6:
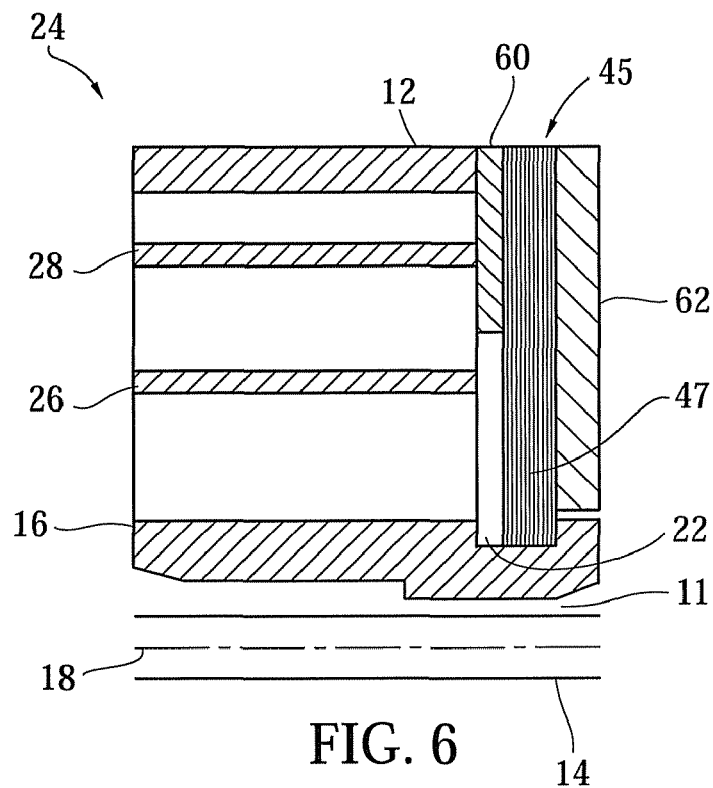
FIG. 6 is a cross sectional view taken generally along line 6-6 of FIG. 3, with a brush seal depicted as a secondary seal.
Figure 7:
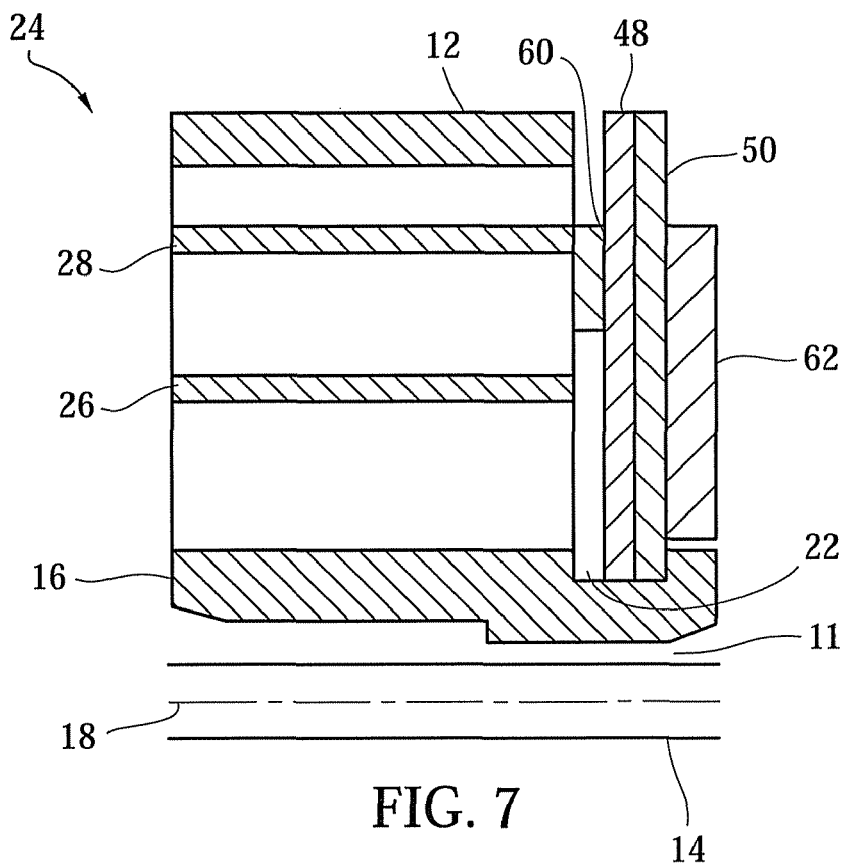
FIG. 7 is a view similar to FIG. 6 except with a secondary seal comprising side-by-side plates.
Figure 8:
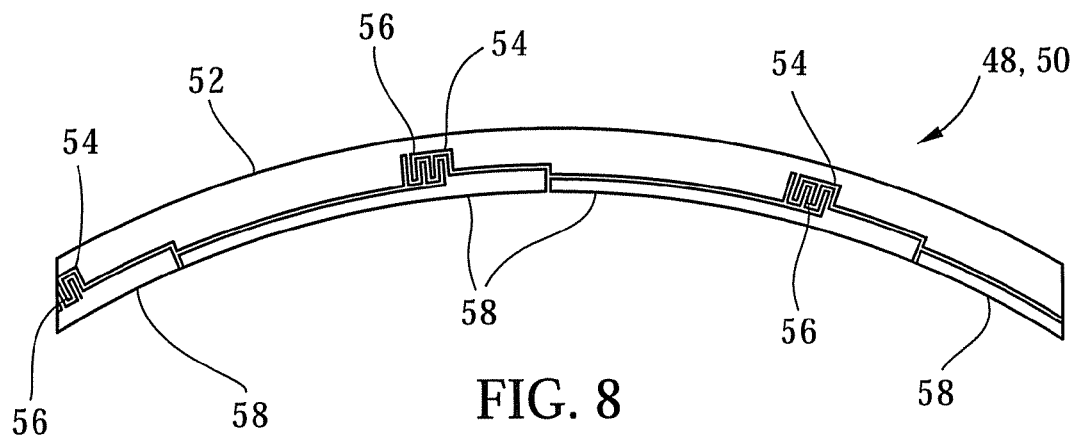
FIG. 8 is an enlarged, side view of a portion of one of the plates shown in FIG. 7.

In the presently preferred embodiment, the seal 10 is also provided with a secondary seal which may take the form of a brush seal 45, as shown in FIG. 6, or a stack of at least two sealing elements oriented side-by-side and formed of thin sheets of metal or other suitable material as shown in FIGS. 7 and 8. The brush seal 45 is positioned so that one end of its bristles 47 extends into the slot 22 formed in the shoe 16. The bristles 47 deflect with the radial inward and outward movement of the shoe 16, in response to the application of fluid pressure as noted above, in such a way as to create a secondary seal of the gap 11 between the rotor 14 and stator 12.

Referring now to FIGS. 7 and 8, the secondary seal of this embodiment may comprise a stack of at least two sealing elements 48 and 50. Each of the sealing elements 48 and 50 comprises an outer ring 52 formed with a number of circumferentially spaced openings 54, a spring member 56 mounted within each opening 54 and a number of inner ring segments 58 each connected to at least one of the spring members 56. The spring member 56 is depicted in FIG. 8 as a series of connected loops, but it should be understood that spring member 56 could take essentially any other form, including parallel bands as in the spring elements 24. The sealing elements 48 and 50 are oriented side-by-side and positioned so that the inner ring segments 58 extend into the slot 22 formed in the shoe 16. The spring members 56 deflect with the radial inward and outward movement of the shoe 16, in response to the application of fluid pressure as noted above, in such a way as to create a secondary seal of the gap 11 between the rotor 14 and stator 12. As such, the sealing elements 58 and 50 assist the spring elements 24 in maintaining the shoe 16 within design clearances relative to the rotor 14.

In the presently preferred embodiment, the spring elements 48 and 50 are formed of sheet metal or other suitable flexible, heat-resistant material. The sealing elements 48 and 50 may be affixed to one another, such as by welding, a mechanical connection or the like, or they may merely placed side-by-side within the slot 22 with no connection between them. In order to prevent fluid from passing through the openings 54 in the outer ring 52 of each sealing element 48 and 50, adjacent sealing elements are arranged so that the outer ring 52 of one sealing element 48 covers the openings 54 in the adjacent sealing element 50. Although not required, a front plate 60 may be positioned between the spring element 24 and the sealing element 48, and a back plate 62 may be located adjacent to the sealing element 50 for the purpose of assisting in supporting the sealing elements 48, 50 in position within the shoe 16.

Figure 9:
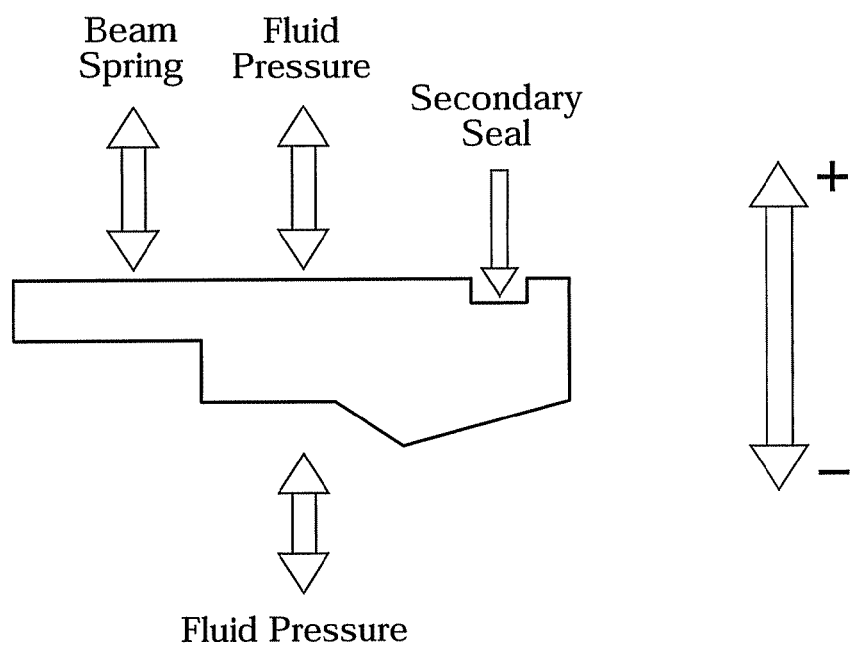
FIG. 9 is a force balance diagram of a shoe depicting the aerodynamic forces, spring forces and secondary seal forces acting on the shoe.

In applications such as gas turbine engines, the seal 10 of this invention is subjected to aerodynamic forces as a result of the passage of air along the surface of the shoes 16 and the rotor 14. The operation of seal 10 is dependent, in part, on the affect of these aerodynamic forces tending to lift the shoes 16 radially outwardly relative to the surface of rotor 14, and the counteracting forces imposed by the spring elements 24 and the secondary seals e.g. brush seal 45 or the stacked seal formed by plates 48, 50 which tend to urge the shoes 16 in a direction toward the rotor 14. These forces acting on the shoe 16 are schematically depicted with arrows in FIG. 9. There must be a balance of forces acting on the seal 10 to ensure that nominal clearance is maintained.

Local pressures acting on the seal 10, induced by the pressure differential across the seal 10, have considerable impact on the force balance of seal 10. As noted above, when the seal gap 11 increases the fluid velocity increases and the pressure decreases along such gap 11 thus drawing the shoe 16 toward the rotor 14. As the seal gap 11 closes, the velocity of the fluid flowing through such gap 11 decreases thus increasing the pressure and forcing the shoe 16 away from the rotor 16. It has been found that the geometric configuration of the surface of the shoe 10 influences the inertia of fluid flowing across the seal 10, and, hence, the velocity of the fluid and the pressure distribution across the seal 10, ultimately affecting the balance of forces applied to the seal 10. As a result, the radial clearance between the shoes 16 and rotor 14 may be either increased or decreased as a result of the geometric configuration of the surface of shoes 16 that faces the rotor 14.

A number of preferred geometries of the shoes 16 are depicted in FIGS. 10A-10G. For ease of illustration, only a portion of a shoe 16 is depicted in FIGS. 10A-10G, and it should be understood that the gap or radial clearance between the shoe 16 and rotor 14 is exaggerated for purposes of illustration. Generally, each of the shoes 16 shown in FIG. 10A-10G include a radially inwardly extending flow contraction area 70, and then variations of converging surfaces, diverging surfaces and other surfaces, as described individually below. For purposes of discussion of FIGS. 10A-10D, the term in a "longitudinal direction" refers to a direction along the longitudinal axis 18 of the rotor 14.

Figure 10A:
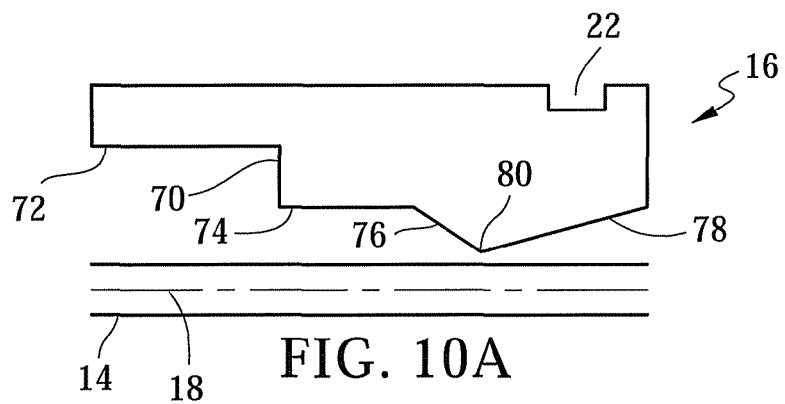
FIGS. 10A-10G depict alternative embodiments of shoe(s) having different geometric features.
Figure 10B:
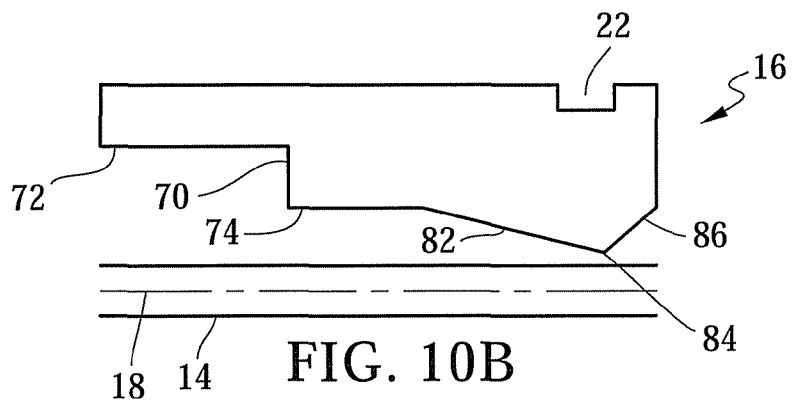
Figure 10C:
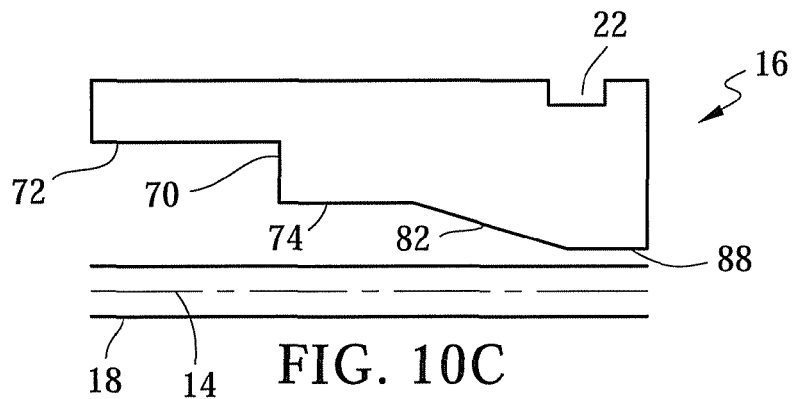
Figure 10D:
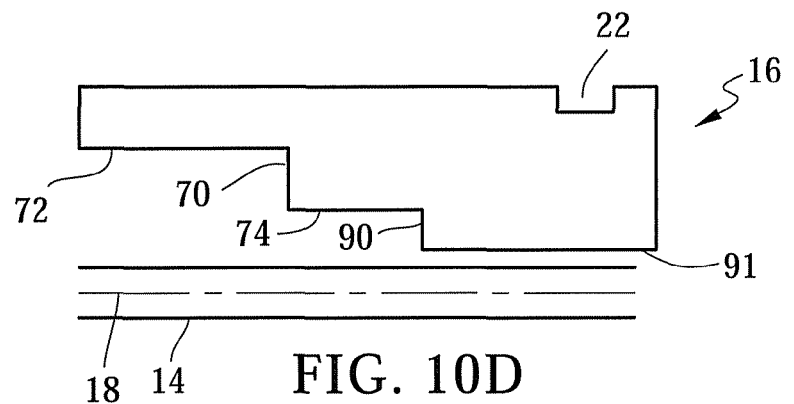

Referring to FIG. 10D, the shoe 16 has a first area 72 of substantially constant radial dimension upstream from the flow contraction area 70, and a second area 74 of substantially constant radial dimension downstream or aft of the step 70. The radial spacing of the second area 74, relative to the rotor 14, is less than that of the first area 72. A converging area 76 extends aft from the second area 74, and connects to a diverging area 78. An edge 80 is formed at the juncture of the converging and diverging areas 76, 78. In the embodiment of FIG. 10A, the length of the converging area 76, measured in a longitudinal direction along axis 18, is less than the length of the diverging area 78.

The shoe 16 illustrated in the embodiment of FIG. 10B has the same flow contracting area 70, and first and second areas 72, 74, as FIG. 10A. A converging area 82 extends from the second area 74 and joins along an edge 84 to a diverging area 86. As seen in FIG. 10B, the length of converging area 82, measured along the longitudinal axis 18 of rotor 14, is greater than the length of the diverging area 86.

Referring to FIG. 10C, a shoe 16 is illustrated having the same construction as FIG. 10B, except that instead of a diverging area connected to the converging area 86, a third area 88 of substantially constant radial spacing extends from the converging area 86. The radial spacing between the third area 88 and rotor 14 is less than that of the second area 74, which, in turn, is less than that of the first area 72.

The converging and diverging areas along the surface of the shoe 16 are eliminated in the embodiment of this invention depicted in FIG. 10D. The same first and second areas 72 and 74 connected to step 70 are employed, as described above, but then a second flow contraction area 90 connects the second area 74 to an elongated area 91 having a substantially constant radial spacing from the rotor 14. The radial spacing between the elongated area 91 and rotor 14 is less than that of the second area 74, which, in turn, is less than that of the first area 72.

Figure 10E:
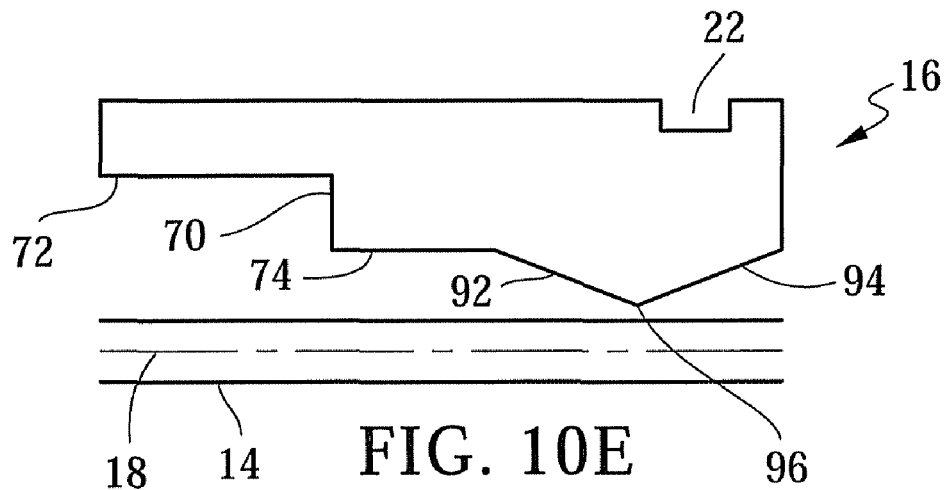

The shoe 16 of FIG. 10E is similar to that shown in FIG. 10A, except a converging area 92 extending from the second area 74, and a diverging area 94 connected at an edge 96 to the converging area 92, have substantially the same length as measured along the longitudinal axis 18.

Figure 10F:
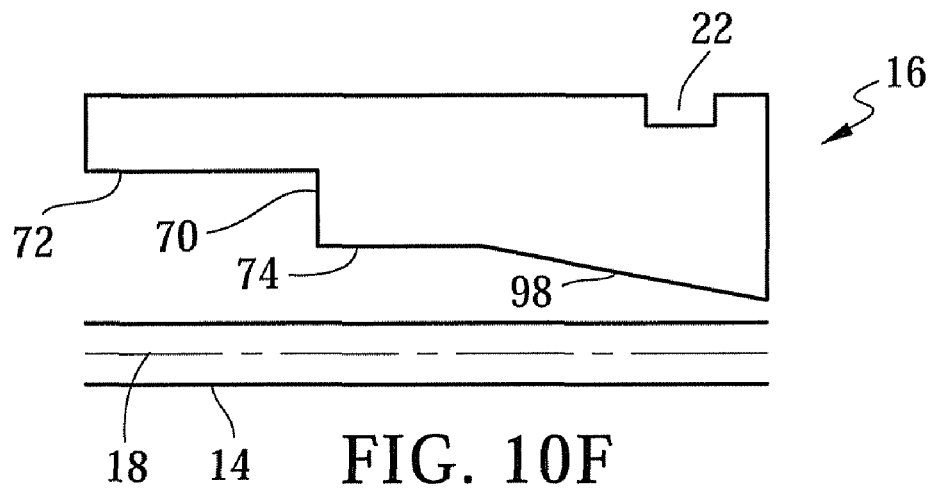

In the embodiment of the shoe 16 illustrated in FIG. 10F, essentially the same construction as that depicted in FIG. 10C is provided except the third area 88 is eliminated and a converging area 98 extends from the second area 74 to the end of the shoe 16. The same reference numbers used in FIG. 10C are employed in FIG. 10F to indicate common structure.

Figure 10G:
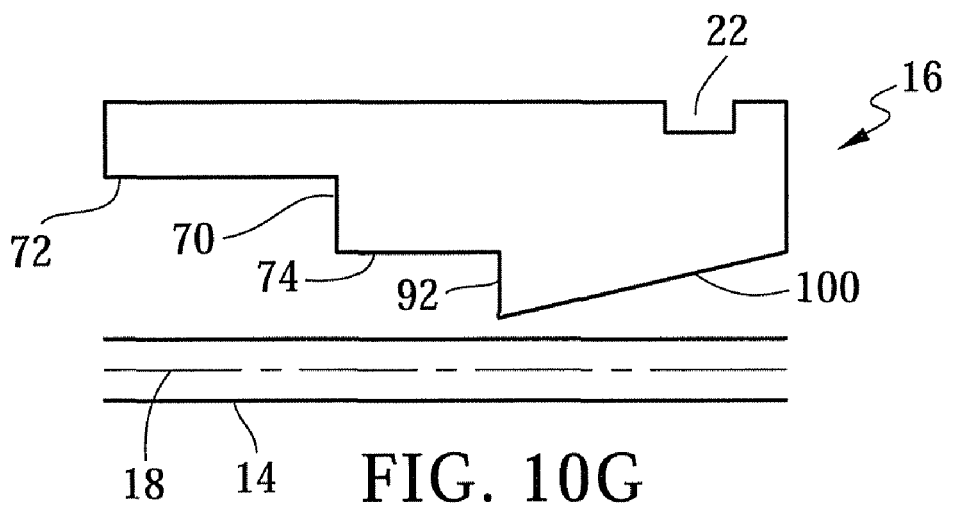

The shoe 16 of FIG. 10G is similar to that of FIG. 10D, except the elongated area 91 in FIG. 10D is eliminated and replaced with a diverging area 100. The diverging area 100 extends from the second flow contraction area 90 to the end edge of the shoe 16. All other structure of the shoe 16 shown in FIG. 10G that is common to that of FIG. 10D is given the same reference numbers.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A seal for sealing a circumferential gap between a first machine component and a second machine component which is rotatable relative to the first machine component about a longitudinal axis, comprising:

at least one shoe having a first surface and a second surface spaced from said first surface, said first surface extending along one of said first and second machine components in a position to create a non-contact seal therewith, said first surface being formed with a first area which extends longitudinally at a substantially constant radial spacing between first and second ends thereof relative to one of said first and second machine components, a second area which extends longitudinally at a substantially constant radial spacing between third and fourth ends thereof relative to one of said first and second machine components, said second area being substantially parallel to and radially spaced from said first area, a flow contraction area connected between said second end of said first area and said third end of said second area, and a converging area extending in a longitudinal direction from said forth end of said second area of substantially constant radial spacing and in a direction toward one of said first and second machine components;

at least one spring element adapted to connect to one of the first and second machine components and being connected to said second surface of said at least one shoe, said at least one spring element being effective to deflect and move with said at least one shoe in response to the application of fluid pressure to said at least one shoe in such a way as to assist in the creation of a primary seal of the circumferential gap between the first and second machine components;

at least one secondary seal acting on said second surface of said at least one shoe and being effective to deflect and move with said at least one shoe in response to the application of fluid pressure to said at least one shoe in such a way as to assist in the creation of a secondary seal of the circumferential gap between the first and second machine components.

2. The seal of claim 1 in which said substantially constant radial spacing of said second area relative to one of said first and second machine components is less than said substantially constant radial spacing of said first area.

3. The seal of claim 1 further including a diverging area extending in a longitudinal direction from said converging area and in a direction away from said one of said first and second machine components.

4. The seal of claim 1 further including a third area of substantially constant radial spacing relative to one of said first and second machine components, said third area extending in a longitudinal direction from said converging area and substantially parallel to said first and second areas.

5. The seal of claim 3 in which said converging area extends a shorter distance in said longitudinal direction than said diverging area.

6. The seal of claim 3 in which said converging area extends substantially the same distance in said longitudinal direction as said diverging area.

7. The seal of claim 3 in which said converging area extends a longer distance in said longitudinal direction than said diverging area.

8. A seal for sealing a circumferential gap between a first machine component and a second machine component which is rotatable relative to the first machine component about a longitudinal axis, comprising:

at least one shoe having a first surface and a second surface spaced from said first surface, said first surface extending along one of said first and second machine components in a position to create a non-contact seal therewith, said first surface being formed with a first area which extends longitudinally at a substantially constant radial spacing between first and second ends thereof relative to one of said first and second machine components, a second area which extends longitudinally at a substantially constant radial spacing between third and fourth ends thereof relative to one of said first and second machine components, said second area being substantially parallel to and radially spaced from said first area, a first flow contraction area connected between said second end of said first area and said third end of said second area, and a second flow contraction area extending from said fourth end of said second area in a direction toward one of said first and second machine components;

at least one spring element adapted to connect to one of the first and second machine components and being connected to said second surface of said at least one shoe, said at least one spring element being effective to deflect and move with said at least one shoe in response to the application of fluid pressure to said at least one shoe in such a way as to assist in the creation of a primary seal of the circumferential gap between the first and second machine components;

at least one secondary seal acting on said second surface of said at least one shoe and being effective to deflect and move with said at least one shoe in response to the application of fluid pressure to said at least one shoe in such a way as to assist in the creation of a secondary seal of the circumferential gap between the first and second machine components.

9. The seal of claim 8 in which said radial spacing of said second area of said first surface of said at least one shoe is less than said radial spacing of said first area thereof.

10. The seal of claim 8 further including a third area of substantially constant radial spacing relative to one of said first and second machine components which is substantially parallel to said first and second areas, said third area extending longitudinally from said second contraction area.

11. The seal of claim 8 further including a diverging area extending longitudinally from said second contraction area and in a direction away from one of said first and second machine components.

12. The seal of claim 10 in which said radial spacing of said third area of said first surface of said at least one shoe is less than said radial spacing of said second area thereof.

* * * * *